(12) United States Patent
Mauri et al.

(10) Patent No.: US 11,506,573 B2
(45) Date of Patent: Nov. 22, 2022

(54) APPARATUS FOR THE ANALYSIS OF THE BEHAVIOR OF A PNEUMATIC TIRE AT THE INTERFACE WITH THE GROUND

(71) Applicant: BRIDGESTONE EUROPE NV/SA, Zaventem (BE)

(72) Inventors: Stefano Mauri, Rome (IT); Lorenzo Alleva, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 0 days.

(21) Appl. No.: 16/978,166

(22) PCT Filed: Feb. 26, 2019

(86) PCT No.: PCT/IB2019/051536
§ 371 (c)(1),
(2) Date: Sep. 3, 2020

(87) PCT Pub. No.: WO2019/171208
PCT Pub. Date: Sep. 12, 2019

(65) Prior Publication Data
US 2021/0041328 A1    Feb. 11, 2021

(30) Foreign Application Priority Data
Mar. 5, 2018  (IT) .................. 102018000003276

(51) Int. Cl.
*G01M 17/02*   (2006.01)
(52) U.S. Cl.
CPC .............................. *G01M 17/027* (2013.01)

(58) Field of Classification Search
CPC ................................................. G01M 17/027
See application file for complete search history.

(56) References Cited

U.S. PATENT DOCUMENTS

| 5,172,590 A | * | 12/1992 | Adachi | G01M 17/027 73/146 |
| 5,174,151 A | * | 12/1992 | Adachi | G01M 17/027 73/146 |
| 2001/0022802 A1 | * | 9/2001 | Kurata | G01M 17/027 374/45 |
| 2003/0029235 A1 | * | 2/2003 | Yurjevich | G01M 17/02 73/146 |

(Continued)

FOREIGN PATENT DOCUMENTS

| DE | 19505533 | 8/1996 |
| DE | 10 2013 107 018 | 1/2015 |

(Continued)

OTHER PUBLICATIONS

International Search Report and Written Opinion received in PCT Application No. PCT/IB2019/051536, dated Aug. 8, 2019, 13 pages.

*Primary Examiner* — Eric S. McCall
(74) *Attorney, Agent, or Firm* — Foley & Lardner LLP

(57) ABSTRACT

The present application refers to an apparatus for the analysis of real data relating to the interface region between a pneumatic tire and the road surface under wet conditions. In particular, such an apparatus makes it possible to detect the ground contact region and the water expulsion profile of a pneumatic tire, particularly on wet surfaces, under differing dynamic driving conditions (rolling, braking, and steering of the pneumatic tire).

8 Claims, 1 Drawing Sheet

(56) References Cited

U.S. PATENT DOCUMENTS

| | | | | |
|---|---|---|---|---|
| 2013/0111984 A1* | 5/2013 | Dorfi | ................... | G01M 17/027 |
| | | | | 73/146 |
| 2013/0319101 A1* | 12/2013 | Lindsay | ................ | B60C 25/002 |
| | | | | 73/146 |
| 2014/0143022 A1* | 5/2014 | Wisniewski | ....... | G06Q 30/0627 |
| | | | | 705/28 |
| 2017/0122842 A1* | 5/2017 | Nojek | ................. | G06F 16/5838 |
| 2019/0346342 A1* | 11/2019 | Ohsawa | ................. | B60C 19/00 |
| 2020/0047569 A1* | 2/2020 | De Stasio | ........... | G01M 17/027 |

FOREIGN PATENT DOCUMENTS

| | | |
|---|---|---|
| EP | 2 554 969 | 2/2013 |
| EP | 2 677 293 | 12/2013 |
| JP | 2003-014428 | 1/2003 |
| JP | 2003-240681 | 8/2003 |
| JP | 2004-354193 | 12/2004 |

\* cited by examiner

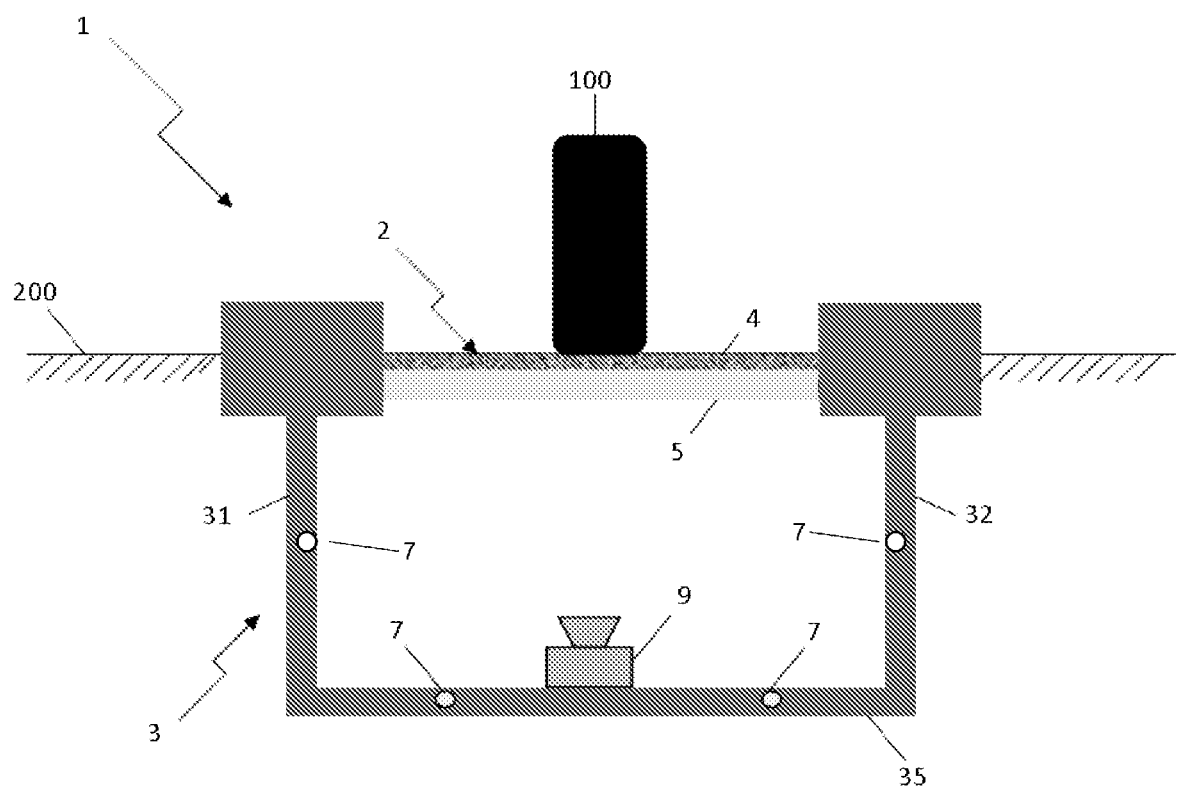

APPARATUS FOR THE ANALYSIS OF THE BEHAVIOR OF A PNEUMATIC TIRE AT THE INTERFACE WITH THE GROUND

CROSS-REFERENCE APPLICATIONS

The present application claims priority to International Patent Application No. PCT/IB2019/051536, filed on Feb. 26, 2019, which itself claims priority to Italian Patent Application No. IT102018000003276A, filed on Mar. 5, 2018, both of which are incorporated herein by reference in their entirety and for all purposes.

TECHNICAL FIELD

The present disclosure refers to an apparatus for the analysis of real data in relation to the interface region between a pneumatic tire and the road surface. In particular, this apparatus makes it possible to detect the region in contact with the ground, and/or the water expulsion profile of a pneumatic tire, particularly on wet surfaces, under differing dynamic driving conditions (for example, rolling, braking and/or steering of the pneumatic tire).

BACKGROUND

Analyzing the behavior of a pneumatic tire under differing dynamic driving conditions, such as rolling, braking and steering, on wet surfaces, is essential in order to evaluate the performance thereof and to ensure a high level of safety. In particular, the analysis of the interface region between the pneumatic tire and the road surface, i.e., the region of contact between the pneumatic tire and the road surface, makes it possible to obtain important information regarding how good the design of the pneumatic tire is, such as the ability to evacuate water under conditions of driving on a wet road.

Analyzing the interface region in order to study the water expulsion profile, i.e., the streams of water expelled through the different grooves of the tread, is important in order to be able to evaluate, under differing dynamic driving conditions, the adhesion of the pneumatic tire and the resistance thereof to the phenomenon of aquaplaning.

In order to carry out these types of analyses it is possible to use theoretical simulation models but it is nonetheless preferable to perform the empirical analysis of the data relating to the actual behavior of the pneumatic tire under differing dynamic driving conditions. In this case, in order to obtain data relating to the actual behavior of the pneumatic tire it is necessary to resort to a road test. It is currently however not possible to perform the analysis of the interface region, especially of the expulsion profile and/or velocity of the water ejected through the different grooves of the tread, with a high degree of accuracy during pneumatic tire tests on wet surfaces under dynamic driving conditions.

In general, for these tests, under differing dynamic driving conditions, the pneumatic tire is made to roll, brake and/or steer in contact with a detection plate of measurement apparatus. Such a detection plate consists of a transparent and smooth layer of glass, resin or polymeric material. Below the detection plate there are sources of illumination and an image detection device, with the lens facing the detection plate in order to acquire a sequence of images of the interface region of the pneumatic tire during the passage thereof.

Under particular test conditions however, for example under wet road test conditions, i.e., in the presence of water on the road surface and therefore on the detection plate, when the pneumatic tire is made to roll, steer or brake upon the detection plate, the images captured by the detection device are not completely usable and/or realistic, in particular due to the reduction of friction due to the presence of water upon the detection plate.

This renders the subsequent study of the expulsion profile and/or velocity of the water ejected through the different grooves of the tread of a pneumatic tire difficult and less reliable, in particular—but not only—on wet surfaces.

DE102013107018 reveals a device for detecting a support surface of a component on a transparent contact loading plate, comprising at least one image acquisition system arranged below the load contact plate and aligned thereupon for detecting the support surface.

EP2554969 reveals a rotary drum used in a machine for testing pneumatic tires which has a base material for the road surface that consists of an aluminum alloy and that is equipped with a road surface whereupon a pneumatic tire is pushed.

SUMMARY

The purpose of the present disclosure is therefore to provide an apparatus for the analysis of the behavior of a pneumatic tire at the interface with the road surface, in particular on a wet road surface, under dynamic driving conditions, which makes it possible to avoid the drawbacks mentioned above with reference to the prior art.

This is achieved by means of an apparatus as discussed herein. Secondary characteristics of the present disclosure are further discussed below.

The present disclosure, in overcoming the aforementioned problems, involves numerous and evident advantages.

In particular, in the apparatus according to the present disclosure, the surface of the detection plate which, in use, is in contact with the pneumatic tire in motion (rolling, braking and/or steering), is implemented in such a way as to increase the friction of the pneumatic tire with the detection plate in relation to the apparatus of the prior art.

In this way, by virtue of the increase in friction, the pneumatic tire adheres more to the detection plate of the apparatus and avoids instead any slipping or sliding in relation to the latter, thereby allowing the image detection device to acquire sharper and more precise images of the water expulsion profile under differing dynamic driving conditions, and that also correspond and are closer to the actual behavior of the pneumatic tire during normal use on the road.

The advantages, as well as the characteristics and usage methods of the present disclosure, will become clear from the following detailed description of preferred embodiments thereof, given purely by way of non-limiting examples, making reference to the accompanying FIGURES, wherein;

FIG. 1 depicts a cross section of a first embodiment of an apparatus according to the present disclosure;

Other advantages, characteristics and the usage methods for the present disclosure, will become clear from the following detailed description of some embodiments, given purely by way of non-limiting examples.

DETAILED DESCRIPTION OF PREFERRED EMBODIMENTS

Various embodiments and variations of the apparatus will now be described, and this with reference to the FIGURES introduced above.

The present disclosure refers to an apparatus for the analysis of the behavior of a pneumatic tire at the interface region between a pneumatic tire and the road surface, under differing dynamic driving conditions (for example, rolling, steering, braking and/or combinations thereof), and under different surface conditions, in particular when wet.

With specific reference to FIG. 1, the apparatus, generally indicated as a whole with 1, comprises a detection plate 2 and a support frame 3, suitable for carrying the latter.

The detection plate 2 and the support frame 3 together form a substantially box-shaped hollow structure.

Preferably, when the apparatus is in use, the detection plate 2 is located at the level of the road surface 200 while the support frame 3 is at least partially below ground. In particular, the detection plate 2 is surrounded and supported along the perimeter thereof by four side walls (e.g., a first sidewall 31, a second sidewall 32, etc.) of the support frame 3, positioned perpendicularly with respect thereto.

Thus, the box-like structure is closed by a bottom wall 35, parallel to the detection plate 2.

The detection plate 2 is multi-layered, i.e., it consists of at least two different layers overlapping one another.

A first layer of the multilayer detection plate is represented by the interface layer 4 which, in use, comes into contact with the pneumatic tire 100 in motion. In order test the behavior of the pneumatic tire on wet surfaces, the interface layer 4 can be covered with water.

This interface layer 4 consists of a material that is preferably plastic and rough, i.e., that has, on one of the surfaces thereof, micro-geometric irregularities such as grooves, wrinkles, ripples or granularity, at least at the interface with the pneumatic tire 100, in such a way as to promote the adherence of the latter to the interface layer 4.

Preferably, the roughness Ra of the interface layer is between 16 µm (micrometers) and 160 µm (micrometers). More preferably, the roughness Ra is between 32 µm (micrometers) and 140 µm (micrometers), even more preferably approximately equal to 125 µm (micrometers).

The interface layer 4 is at least partially transparent, preferably optically transparent, i.e., it allows most of the light that strikes it to be transmitted through it without being reflected.

The transparency of the interface layer 4 is greater when in contact with water than under dry conditions, i.e., under wet conditions it allows more of the light that strikes it to be transmitted through it without being reflected than under dry conditions.

The characteristic is particularly advantageous for the analysis of the behavior of a pneumatic tire 100 at the interface region between a pneumatic tire and the road surface, under differing dynamic driving conditions (for example, rolling, steering, braking and/or combinations thereof), in particular when wet.

The roughness range Ra of the interface layer 4 between 16 µm (micrometers) and 160 µm (micrometers) represents a window of best compromise between a roughness that is too low (under 16 µm (micrometers)), which would favor the transparency of the interface layer 4 but which would compromise the improved characteristics of adhesion with the pneumatic tire 100, and a roughness that is too high (above 160 µm (micrometers)), which would increase the improved characteristics of adhesion with the pneumatic tire 100 but which would reduce the transparency of the interface layer 4.

The surface having the roughness Ra is preferably obtained by means of molding.

The multilayer detection plate 2 further comprises a base layer 5. This layer 5 is directly coupled to the interface layer 4.

For the purposes of this coupling the interface layer 4 preferably has a smooth adhesive lower surface in direct contact with the base layer 5. This smooth lower surface is located on the opposite side of the surface having the roughness Ra of the interface layer 4.

The base layer 5 is made from a material that is at least partially transparent, preferably optically transparent, in such a way that most of the light that hits it can pass through it without being reflected. For example, the base layer 5 can be made of glass or plexiglas.

In a preferred embodiment the apparatus (1) further comprises a layer of water upon the multilayer detection floor (2) in contact with the interface layer (4), This layer of water is preferably less than 10 mm (millimeters), more preferably less than 7 mm (millimeters), even more preferably equal to about 2 mm (millimeters).

The base layer 5 can advantageously be directly illuminated by at least one lighting element 7 positioned on the support frame 3. Preferably, in order to ensure uniform illumination, a plurality of lighting elements 7 is applied to the side walls (e.g., the first sidewall 31, the second sidewall 32, etc.) of the support frame 3.

Alternatively, or in addition, some of the lighting elements 7 can be applied to the bottom wall 35 of the support frame 3.

The apparatus may further comprise an image detection device 9 arranged in such a manner as to be able to frame and capture the base layer 5 directly (or indirectly by means of an appropriately placed mirror). Preferably, the image detection device 9 rests on the bottom wall 35 of the support frame 3, or is inserted within said wall, with the lens thereof pointing towards the base layer 5.

Furthermore, the image detection device 9 is preferably a high-speed camera.

By virtue of the illumination and transparency of the base layer 5 and the interface layer 4, the image detection device 9 can clearly acquire a sequence of images of the pneumatic tire interface region 100 during the passage thereof upon the interface layer 4 of the detection plate.

The apparatus has heretofore been described with reference to preferred embodiments. It is to be understood that there may exist other embodiments that relate to the same inventive nucleus, as defined by the scope of protection of the claims set out below.

The invention claimed is:

1. An apparatus for the analysis of dynamic behavior of a pneumatic tire within an interface region with the ground, the apparatus including:
   a support frame;
   a multilayer detection plate carried by said support frame, the multilayer detection plate comprising:
   an interface layer which, in use, comes into contact with the pneumatic tire in motion, the interface layer being at least partially transparent and having a roughness (Ra) of greater than or equal to 16 micrometers at least at the interface region, the interface layer having greater transparency under wet conditions than under dry conditions; and
   a base layer coupled to said interface layer such that the interface layer is positioned between the base layer and the pneumatic tire as the pneumatic tire contacts the interface region, the base layer being at least partially transparent; and an image detection device arranged in such a manner as to be able to frame and directly or indirectly capture the base layer of the multilayer detection plate.

2. The apparatus of claim 1, wherein the roughness (Ra) of said interface layer is between 16 micrometers and 160 micrometers, inclusive.

3. The apparatus of claim 1, wherein the roughness (Ra) of said interface layer is between 32 micrometers and 140 micrometers, inclusive.

4. The apparatus of claim 1, wherein the roughness (Ra) of said interface layer is equal to about 125 micrometers.

5. The apparatus of claim 1, wherein said interface layer has a rough surface finish comprising a plurality of micro-geometric irregularities.

6. The apparatus of claim 1, wherein the image detection device is a high-speed camera.

7. The apparatus of claim 1, further comprising a lighting element suitable for directly illuminating the base layer of the multilayer detection plate.

8. The apparatus of claim 1, further comprising a layer of water upon the multilayer detection plate in contact with the interface layer.

\* \* \* \* \*